United States Patent
Banse et al.

(10) Patent No.: US 12,523,068 B2
(45) Date of Patent: Jan. 13, 2026

(54) HOOP LOCK

(71) Applicant: ABUS August Bremicker Söhne KG, Wetter-Volmarstein (DE)

(72) Inventors: Manuel Banse, Herborn (DE); Christian Prellwitz, Burbach (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 195 days.

(21) Appl. No.: 17/950,137

(22) Filed: Sep. 22, 2022

(65) Prior Publication Data

US 2023/0095874 A1 Mar. 30, 2023

(30) Foreign Application Priority Data

Sep. 29, 2021 (DE) .......................... 102021125310.1

(51) Int. Cl.
*E05B 71/00* (2006.01)
*E05B 15/16* (2006.01)

(52) U.S. Cl.
CPC .......... *E05B 71/00* (2013.01); *E05B 15/1614* (2013.01)

(58) Field of Classification Search
CPC ...... E05B 15/16; E05B 15/1614; E05B 67/04; E05B 67/06; E05B 71/00; B32B 1/00; B32B 1/08; B32B 3/20
See application file for complete search history.

(56) References Cited

U.S. PATENT DOCUMENTS

| | | | | |
|---|---|---|---|---|
| 3,777,517 | A * | 12/1973 | Shwayder | ........... E05B 15/1614 70/53 |
| 4,182,454 | A | 1/1980 | Tohms | |
| 4,561,272 | A * | 12/1985 | Goldstein | ............... E05B 67/06 70/417 |
| 5,417,092 | A | 5/1995 | Iu | |
| 5,488,845 | A | 2/1996 | Hsieh | |
| 2005/0092038 | A1* | 5/2005 | Becker | .................. E05B 67/063 70/53 |
| 2013/0196170 | A1* | 8/2013 | Tomantschger | ........ B32B 15/08 428/35.8 |
| 2019/0368225 | A1* | 12/2019 | Perrenoud | ............... E05B 71/00 |

FOREIGN PATENT DOCUMENTS

| | | |
|---|---|---|
| DE | 2353514 A1 | 4/1975 |
| DE | 3416126 A1 * | 8/1985 |
| DE | 3416126 C2 * | 8/1989 |
| DE | 29903865 U1 | 5/1999 |

(Continued)

OTHER PUBLICATIONS

Machine generated translation of DE 3416126 A1. (Year: 2024).*

(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A hoop lock comprises a lock body and a hoop which is lockable to the lock body. The hoop comprises a metal tube having a cavity extending in a longitudinal direction of the tube. In the cavity is a reinforcing filling. At least one hoop end comprises a locking structure for a locking engagement with a locking device of the lock body. The locking structure is formed at an outer side of the tube without forming an opening to the cavity of the tube.

21 Claims, 1 Drawing Sheet

(56) References Cited

FOREIGN PATENT DOCUMENTS

Figure 1:
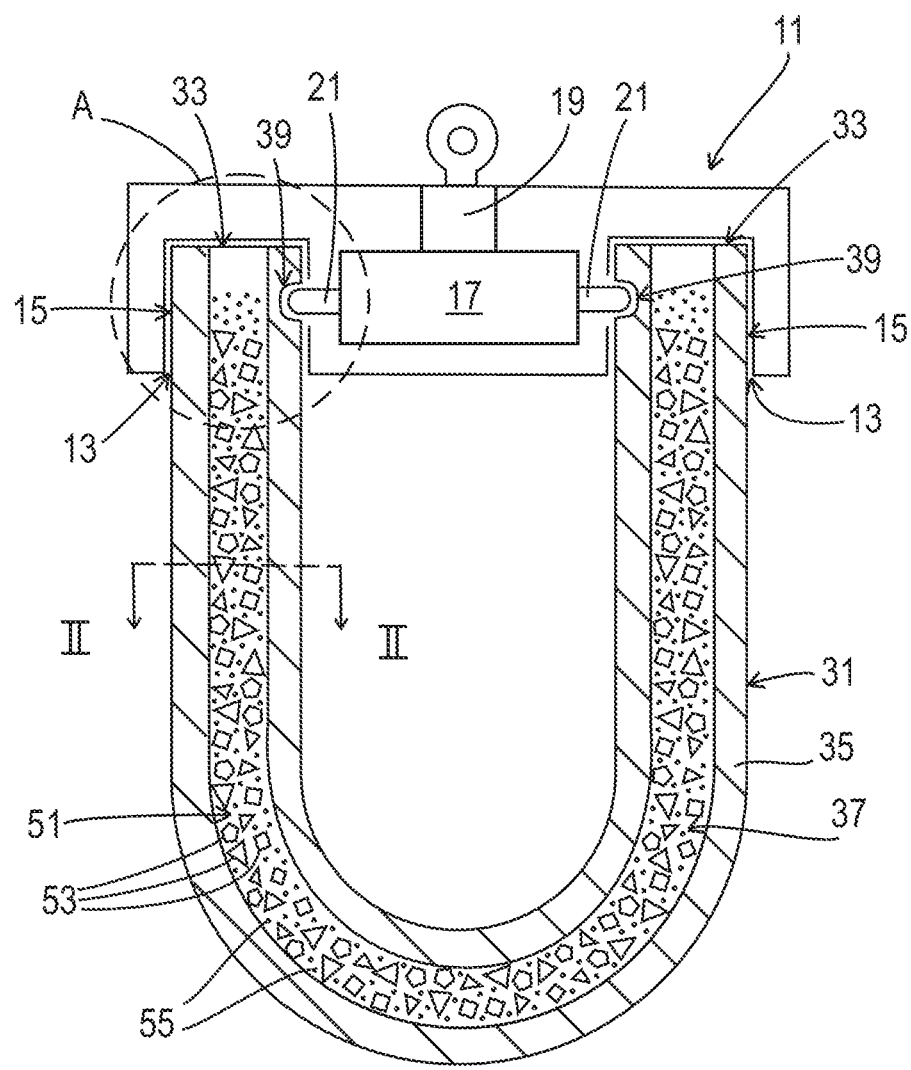

| | | | | |
|---|---|---|---|---|
| DE | 10026701 | A1 | 12/2001 | |
| DE | 10358300 | A1 | 7/2005 | |
| DE | 102004052463 | A1 | 5/2006 | |
| DE | 102005043926 | A1 | 3/2007 | |
| DE | 102011108807 | A1 | 1/2013 | |
| DE | 102018111302 | A1 | 11/2019 | |
| DE | 102018116434 | A1 | 1/2020 | |
| EP | 0675995 | B1 | 10/1996 | |
| EP | 0638473 | B1 | 5/1997 | |
| EP | 0689987 | B1 | 4/1998 | |
| EP | 1905676 | A2 | 4/2008 | |
| EP | 2333204 | A1 | 6/2011 | |
| EP | 1905677 | B1 | 7/2012 | |
| EP | 3699375 | A1 * | 8/2020 | ........... E05B 39/002 |
| GB | 1392268 | A | 4/1975 | |
| JP | S5629159 | U | 3/1981 | |
| WO | 9410414 | A1 | 5/1994 | |
| WO | 2004041629 | A2 | 5/2004 | |
| WO | 2006109299 | A2 | 10/2006 | |
| WO | 2015185380 | A1 | 12/2015 | |
| WO | WO-2020023423 | A1 * | 1/2020 | ......... B60R 25/0225 |

OTHER PUBLICATIONS

"At." Merriam-Webster.com Dictionary, Merriam-Webster, https://www.merriam-webster.com/dictionary/at.Accessed Dec. 30, 2024. (Year: 2024).*

Espacenet machine translation of DE 3416126 A1, generated Aug. 9, 2024. (Year: 2024).*

Espacenet machine translation of EP 3699375 A1, generated May 15, 2025. (Year: 2025).*

* cited by examiner

HOOP LOCK

CROSS-REFERENCE TO RELATED APPLICATION

This application claims the benefit and priority of German Patent Application No. DE 102021125310.1 filed on Sep. 29, 2021. The entire disclosure of the above application is incorporated herein by reference.

FIELD

The present invention relates to a hoop lock, in particular for a two-wheeled vehicle, for example, a bicycle or a motor bike, comprising a lock body and a hoop, wherein the hoop may selectively be brought into an open position or brought into a closed position in which the hoop is lockable at the lock body.

BACKGROUND OF THE INVENTION

Such a hoop lock is used, for example, to secure a two-wheeled vehicle against any unauthorized driving away, for example in that the hoop is passed through a spoked wheel of the two-wheeler. Alternatively or additionally, such a hoop lock may be used to secure a two-wheeler to a stationary object, for example to a lamppost. In general, such a hoop lock may be used to secure an object against unauthorized use or access, wherein the hoop is brought into the locked position and locked. However, the authorized user may selectively bring the hoop into the open position, in which the hoop is opened relative to the lock body or the hoop is completely released from the lock body. From DE 100 26 701 A1, such a hoop lock with a mechanical locking cylinder is known. From DE 10 2018 111 302 A1 such a hoop lock with an electrically driven locking device is known.

The hoop may have a substantially U-shape as is generally known from DE 299 03 865 U1, U.S. Pat. Nos. 5,417,092 A, 5,488,845 A, WO 94/10414 A1, DE 10 2018 116 434 A1 or EU design EM 002113266-0002 (but without the tapered or pointed hoop ends shown in some of these documents). Alternatively, the hoop here in question may also have a linear shape, for example, as for padlocks generally known from WO 2006/109299 A2 or EP 2 333 204 A1, or for brake disc locks as is generally known from DE 10 2005 043 926 A1, or for frame locks as is generally known from DE 103 58 300 A1 or DE 10 2004 052 463 A1, or for scaffolding locks as is generally known from WO 2015/185380 A1. Furthermore, the hoop here in question may also be configured from multiple parts, in particular with a plurality of members pivotably connected to one another, for example, as a folding lock, as is generally known from EP 0 638 473 B1, EP 0 675 995 B1 or EP 0 689 987 B1.

Such a hoop lock should be as secure as possible against being broken open, in particular against attacks on the hoop by sawing (i.e. cutting through with a geometric specified cutting edge) or pinching. In recent years, attacks by battery-operated cut-off saws (also designated as angle grinders or a flex device) have increased (i.e., cutting through with a geometric unspecified cutting edge).

SUMMARY OF THE INVENTION

It is an object of the present invention to achieve a hoop lock that is as secure as possible against being broken open.

This object is achieved by a hoop lock having the features of claim 1.

The hoop lock comprises a lock body and a hoop. The lock body comprises, in particular at an outer side, at least one introduction opening which opens into an introduction passage. The lock body further comprises a locking device. The hoop may selectively be brought into an open position or a closed position relative to the lock body. The hoop comprises at least one hoop end which, in the closed position of the hoop, protrudes through the respective introduction opening into the associated introduction passage of the lock body. In the closed position, the hoop may be locked to the lock body by the locking device. The hoop comprises a metal tube having a cavity extending in a longitudinal direction of the tube. Within this cavity is a reinforcing filling which comprises a granulate embedded in a binding material. In the closed position of the hoop, the reinforcing filling extends at least to the height of the respective introduction opening of the lock body. The hoop end(s) comprise(s) at least one respective locking structure for a locking engagement with the locking device of the lock body. The respective locking structure is formed at an outer side of the tube, without forming an opening to the cavity of the tube.

In other words, the hoop lock comprises a hoop with one or more ends that may selectively engage in a lock body. In this closed position of the hoop, the hoop may be locked by means of a locking device arranged in the lock body and thus is secured against unauthorized opening or complete detachment from the lock body. Thus, the hoop and the lock body may form, for example, a closed loop. Through the authorized operation of the locking device, for example, by means of a physical identification means or a code, the hoop may be unlocked and subsequently opened or released from the lock body.

The hoop comprises a tube with a cavity generally extending in a longitudinal direction of the tube. In particular, the cavity may extend continuously along the entire length of the hoop, wherein however, interruptions may also be provided, in particular an interruption in a central section of the hoop.

In the cavity of the hoop or tube there is a reinforcing filling which comprises a granulate, i.e. a plurality of particles of a first material, and a binder, i.e. a second material which fixes the particles. The reinforcing filling does not need to fill out the entire cavity of the tube but may be set back relative to the end(s) of the tube and/or have individual gaps (which however are preferably smaller than the inner diameter of the tube). At least one end of the hoop comprises at least one respective locking structure (e.g., a recess) configured to selectively enter into a locking engagement with a section or an element of the locking device of the lock body in order to lock the hoop to the lock body.

The respective locking structure is formed at an outer side of the tube of the hoop and may comprise, for example, a round shape (e.g., a spherical segment) or an elongated shape (e.g., a transverse slit or a web). The respective locking structure may comprise a locking recess, or a locking protrusion (e.g., a thickened portion), or a combination of locking recess and locking protrusion. The respective locking structure may extend along only a portion of the circumference of the tube or along the entire circumference of the tube (e.g., as an annular groove or annular bead). The respective locking structure may be introduced to the tube by machining (e.g., by milling) or it is non-machined (e.g., by stamping). The wall thickness of the tube and the respective locking structure (in particular, the depth thereof in the case of a locking recess) are however matched to each other in such a way that the locking structure does not form an opening to the cavity of the tube, i.e. there is no passage to the interior of the tube, but rather, the respective locking structure has a closed design. The tube is thus also closed circumferentially at the height of the respective locking structure.

A hoop lock of this type is characterized by being highly secure against being broken open with regards to a possible use of force on the hoop. The tube of the hoop is made of metal, for example steel, and can therefore exhibit the characteristic toughness of metal materials. Therefore, the hoop has a high tensile strength. This makes it more difficult for attacks, in particular attacks such as forcing-apart or pinching. If an attempt is made to rip the hoop from of the lock body, for example in the case of a U-shape hoop, by means of a forcing-apart tool acting parallel to the legs of the U-shape, high tensile forces are transferred to the locking device engaging with the locking structure of the hoop in the lock body.

However, this interface between the hoop and the lock body has a high stability, since the respective locking structure at the outer side of the tube of the hoop is designed as a closed structure, i.e., in the case of a locking recess, as a pure recess (a type of blind hole), without forming an opening to the cavity of the tube (i.e., a type of through-hole). Due to this uninterrupted design of the tube at the respective locking structure, a weakening of the tube is prevented or at least minimized in that area where particularly high tensile forces are exerted on the tube in the case of the described attempt to break it open.

In the inside of the tube, the reinforcing filling having the granulate contained within can additionally ensure a high level of protection against sawing and grinding, since the particles used to form the granulate, which, unlike the metal of the tube, have a higher brittleness but also a greater hardness. This makes attacks by sawing or grinding, for example by means of a cut-off grinder, particularly difficult. This additional protection against sawing and grinding as a result of the reinforcing filling, occurs at least in that section of the hoop which is exposed in the closed position of the hoop, i.e. does not project into the lock body. Namely, in the closed position of the hoop, the reinforcing filling starting from the exposed section of the hoop extends at least up to the height of the introduction opening(s) of the lock body. The described closed design of the tube of the hoop in the area of the locking structure(s) may in this context bring about a further advantage. During the manufacturing of the hoop, when the reinforcing filling is filled into the cavity of the tube, the reinforcing filling cannot in fact unintentionally escape from the side of the tube through openings, which would be present if the locking structure(s) was formed as a passage or passages between the outer side and the cavity of the tube.

In some embodiments, the reinforcing filling in the cavity of the tube may extend, starting from an exposed section of the hoop in the closed position, at least to the height of the at least one locking structure of the hoop or tube. This may contribute to a greater stability of the hoop. In particular, the reinforcing filling may also extend beyond the respective locking structure. It is however not necessary for the reinforcing filling to extend to the respective end of the tube of the hoop and for example end flush with the tube end. This is because within the lock body, the protection ensured by the reinforcing filling against sawing and grinding is not required.

If the lock body comprises several introduction openings for the hoop, in some embodiments the reinforcing filling in the cavity of the tube may extend continuously between the introduction openings of the lock body when the hoop is in the closed position. Thus, due to the reinforcing filling a complete protection against sawing and grinding is achieved.

In some embodiments, the respective hoop end equipped with the locking structure may be formed at the height of the locking structure without having any additional reinforcing element in the cavity of the tube, i.e., without an insert or the like. As a result, the manufacture of the hoop is simplified. Due to the high tensile stability of the tube as a result of the closed design of the locking structure(s), such a reinforcing element is not required. However, cover caps may be provided at the respective hoop end which do not fulfill a reinforcing function, but rather, for example, prevent dirt from penetrating into the cavity of the tube, exclude the risk of injury at the edges of the tube ends or fulfill a decorative function. However, in alternative embodiments, such an additional reinforcing element may be arranged in the cavity of the tube at the height of the respective locking structure.

In some embodiments, the tube of the hoop may be formed of hardened or self-hardening steel. As a result, particularly great hardness and strength is achieved.

In some embodiments, the tube of the hoop may have a circular, oval or polygonal cross-section, in particular a square, hexagonal or elongated rectangular cross-section.

As described above, the wall thickness of the tube of the hoop is chosen such that the respective locking structure does not form any opening to the cavity of the tube. However, the cavity of the tube should have a certain diameter (clearing width) such that the reinforcing filling comprises a sufficient number of particles and a sufficient degree of coverage of particles of the granulate. For this purpose, in some embodiments it is provided for, that the tube of the hoop has a wall thickness that is at least a quarter, in particular at least a third, of the outer diameter of the tube. These specifications refer to the minimum outer diameter of the tube in the case of a non-circular cross-section of the tube, for example in the case of a square cross-section of the tube to the edge length of the square (and not, for example, to the diagonal). Accordingly, in some embodiments, the inner diameter of the tube may have a value that is at most one-half or at most one-third of the outer diameter of the tube.

In some embodiments, the cavity of the tube may extend to the at least one hoop end of the hoop. This may simplify the manufacture of the tube and facilitate the filling of the reinforcing filling into the cavity of the tube. Alternatively or additionally, the cavity of the tube may extend along the entire length of the hoop.

In some embodiments, the tube of the hoop may have a constant outer diameter and/or a constant wall thickness and/or a constant inner diameter along the entire length of the hoop. As a result, the manufacturing is simplified, since, for example, an endless tube as a semi-finished product may be used and only the incorporation of the locking structure(s) is required. Further, expansions of the diameter of the tube which can lead to a weakening of the tube can be avoided. Furthermore, constrictions of the cavity of the tube which can make the insertion of the reinforcing filling difficult can be avoided.

In some embodiments, the outer diameter of the tube of the hoop may have a value in the range of 12 mm to 18 mm (for example, of about 16 mm) in the case of a circular cross-section, ora value in the range of 10 mm to 16 mm (for example, of about 13 mm) in the case of a square cross-section. However, other outer diameters and geometries are also possible.

In some embodiments, the granulate of the reinforcing filling may comprise hard metal particles (for example, tungsten carbide, titanium carbide, or titanium nitride) and/or ceramic particles (for example, aluminum oxide or silicon nitride). Due to this, a high level of protection against sawing and grinding may be achieved.

In some embodiments, the particles of the granulate may be non-uniformly formed and/or have sharp edges. For example, the particles may be splinter-shaped. The particles may be chaotically (i.e., unsystematically) arranged and oriented within the reinforcing filling. In particular, the particles may be sized and formed in such a way that there is an overlap of multiple particles arranged successively within the cavity of the tube substantially along all possible viewing axes. Due to one or more of these features, a particularly effective protection against sawing and grinding is achieved, in particular against an attack by means of an abrasive cutter.

In some embodiments, the granulate may have a granularity in the range of 0.5 mm to 5 mm, in particular in the range of 1.5 mm to 2.5 mm, whereby this value is however preferably selected in dependence of the inner diameter of the tube of the hoop.

In some embodiments, the inner diameter of the tube may be greater than the granularity of the granulate by a factor in the range of 2 to 3. Due to this, a degree of coverage of the particles of the granulate may be achieved that ensures a high degree of protection against sawing and grinding, without the individual particles being so small in relation to the clearing width of the cavity of the tube that they allow a saw-blade to pass through as a result of lateral deflection.

In some embodiments, the binding material of the reinforcing filling may comprise a solder, in particular a metallic solder. As a result, the granulate of the reinforcing filling (in particular, a plurality of particles forming the granulate and embedded in the solder) may be effectively fixed in the ready-to-use state of the hoop. In particular, a material bond (at the atomic or molecular level) may be formed. Nevertheless, due to a certain ductility (in contrast to, for example, an adhesive), a solder simplifies the manufacture of a U-hoop, for example, in the forming of the U-hoop. Furthermore, in the event of an attack by means of an abrasive cutter, a metallic solder can easily dissipate the heat generated over the entire hoop (in particular the metal tube) so that the stationary fixing of the granulate of the reinforcing filling is maintained since a melting of the solder is prevented by the heat dissipation. In particular, a metal-bonding soft solder, a hard solder or also a pure metal (such as copper, aluminum or tin) may be provided as the solder.

In some embodiments, the inside boundary surface of the cavity of the tube, at least in the region of the reinforcing filling, may have a roughened or drawn surface. A roughened or drawn surface has the advantage of increasing the overall surface area, whereby the reinforcing filling may bond better with the tube.

In some embodiments, the locking device of the lock body may comprise at least one movable latch, wherein the hoop in the closed position may be locked at the lock body by moving the respective latch into a locking position in which the latch enters into a locking engagement with the respective locking structure of the tube.

The locking device may be constructed purely mechanically, for example, having a key-operated lock cylinder. In some embodiments, the locking device may be electromechanically configured, for example with an electronic locking cylinder, an electric motor or an electromagnet that drives the latch or latches.

In some embodiments, the hoop may be configured as a U-hoop, wherein the tube of the hoop is substantially U-shaped. Such a U-hoop may have a variety of shapes, as is known from the documents mentioned in the introduction. For example, such a U-hoop may have two legs which may be connected to each other in particular by a connecting section. A round transition may be provided between the two legs of the U-shape, whereby however, generally an angular transition may also be provided. The two legs of the U-shape may be oriented parallel or at an acute angle to each other. The two legs of the U-shape may form two hoop ends, wherein the two hoop ends are preferably oriented parallel to each other, to enable insertion of both hoop ends into the associated introduction passages of the lock body. Provided that only one of the two hoop ends comprises one or more locking structure(s), the other hoop end may, for example, comprise a hook-in section for hooking the U-hoop to the lock body, as is known from the documents mentioned in the introduction (e.g. WO 94/10414 A1).

In some embodiments, the lock body of the hoop lock may have an elongated shape, for example with a circular, oval or a rectangular cross-section. The elongated shape may in particular be oriented perpendicular to the longitudinal axis of a U-hoop.

As an alternative to a U-shape, the hoop and the tube may be configured at least substantially linear, as is known from the documents mentioned in the introduction. In some embodiments, the locking structure may be provided at one end of such a linear hoop, and for example, a thickened portion may be provided at the other end for limiting the movability of the hoop. Furthermore, the hoop may be configured from several parts, as is known from the documents mentioned in the introduction, wherein a corresponding number of tubes equipped with the reinforcing filling may be provided, for example in the case of a folding lock. A curved shaped hoop is also possible, for example a C-shaped rotatable hoop of a padlock or a two-wheeled frame lock. In some embodiments, one end of the hoop may be permanently fixed to the lock body (in particular, rotatably or pivotably).

The at least one locking structure of the hoop or tube may in some embodiments, be formed by a locking recess that is closed as described.

The present invention also relates in general terms to a hoop lock, in particular for a two-wheeled vehicle, having a lock body and a hoop, wherein the hoop can be brought selectively into an open position or a closed position, wherein in the open position the hoop is open or is detached from the lock body and in the closed position is lockable at the lock body, wherein the lock body comprises a locking device for locking the hoop, wherein the hoop comprises a tube formed of metal and having a cavity extending in a longitudinal direction of the tube in which a reinforcing filling is disposed, wherein the reinforcing filling comprises a granulate embedded in a binding material, wherein at least one end of the hoop comprises at least one locking structure for engaging the locking device, wherein the locking structure is formed at an outer side of the tube without forming an opening to the cavity of the tube.

By using a hoop having a tube made of metal and a reinforcing filling comprising a granulate, a high protection against a breaking-open is achieved (high tensile strength of the metal tube; no weakening due to a radial through-hole lock opening of the tube, but rather a closed locking structure; protection against sawing and grinding due to the reinforcing filling).

The features and embodiments described above in connection with the hoop lock may also be provided for this hoop lock. In particular, in the closed position of the hoop, the reinforcing filling may extend at least to the height of an introduction opening of the lock body at which the hoop end engages the lock body. The locking device of the lock body may comprise at least one movable latch, wherein in the closed position, the hoop may be locked at the lock body by moving the respective latch into a locking position in which the latch enters into locking engagement with the associated locking structure of the tube. The locking structure of the tube may in particular comprise a locking recess.

The hoop may have a linear shape or a curved shape. In some embodiments, the hoop may have two ends, wherein at least one locking structure is provided at both ends, or wherein the at least one locking structure is provided at only one end, and the other end is permanently supported to the lock body (in particular, rotatably or pivotably, for example according to a type of padlock).

The invention also relates to a method of manufacturing a hoop for a hoop lock, in particular according to one of the embodiments described above, wherein the method comprises at least the following steps, preferably in the order described:
  providing a metal tube comprising a cavity extending in a longitudinal direction of the tube;
  forming, at least at one end of the tube, at least one locking structure at an outer side of the tube without forming an opening to the cavity of the tube;
  filling the cavity with a reinforcing filling comprising a mixture of a granulate and a binding material in loose form;
  heating and subsequently cooling the binding material in order to first melt and then solidify the binding material so that the granulate is fixedly embedded in the binding material.

The reinforcing filling filled into the cavity in loose form may form a homogeneous mixture out of the granulate and the binding material. For this purpose, the binding material may exist in the form of particles, in particular spherical particles.

The invention also relates to a method of manufacturing a hoop for a hoop lock, in particular according to one of the embodiments described above, wherein the method comprises at least the following steps, preferably in the order described:
  providing a metal tube comprising a cavity extending in a longitudinal direction of the tube;
  forming, at least at one end of the tube, at least one locking structure at an outer side of the tube without forming an opening to the cavity of the tube;
  filling reinforcing granulate in solid but loose form into the cavity;
  filling a heated binding material (in particular a molten solder) in liquid form into the cavity;
  subsequent cooling of the binding material in order to solidify the binding material so that the reinforcing granulate is fixedly embedded in the binding material.

The invention also relates to a method of manufacturing a hoop for a hoop lock, in particular according to one of the embodiments described above, wherein the method comprises at least the following steps, preferably in the order described:
  providing a metal tube comprising a cavity extending in a longitudinal direction of the tube;
  forming, at least at one end of the tube, at least one locking structure at an outer side of the tube without forming an opening to the cavity of the tube;
  filling a reinforcing granulate in a solid but loose form into the cavity;
  applying a stopper (tight or with passages) comprising a binding material (in particular a metallic solder) to at least one end of the tube in order to close the cavity at this end;
  heating the tube and thus the stopper of binding material in such a way that the binding material melts and flows into the reinforcing granulate within the cavity of the tube;
  subsequently cooling the tube and thus the binding material in order to solidify the binding material so that the reinforcing granulate is fixedly embedded in the binding material.

As a result, the hoop may be manufactured in a simple and cost-effective manner. The features and embodiments described in connection with the hoop lock according to the invention, may also be provided in the manufacturing process. For example, the reinforcing granulate may in turn comprise a plurality of particles of a high degree of hardness, and the binding material may in particular comprise a solder.

After melting and solidifying the binding material, this may take any shape or structure in order to fix the granulate in place. In particular, the binding material may form a material bond with the granulate and the tube, so that the entire reinforcing filling is fixedly connected with the inside of the tube.

Filling of the reinforcing filling or reinforcing granulate and the binding material into the cavity may be performed from at least one end of the tube, in particular from two ends in the case of a U-shape.

In some embodiments, the heating and subsequent cooling of the binding material may be performed in such a way that a simultaneous hardening of the metal of the tube takes place. For this purpose, suitable heating and quenching temperatures and durations may be intended for this purpose.

In the case of a U-lock, the method may also include a bending of the tube substantially into a U-shape. The step of bending the tube may be carried out before the filling of the reinforcing filler. A reverse sequence is also possible, in which case the binding material for this may in particular be brought into a highly viscous state by appropriate heating.

After the binding material has been heated and cooled, the hoop can be adjusted (bended or straightened) and/or finished (for example, coated or painted).

DRAWINGS

The invention is explained in the following by way of example only, with reference to the drawings.

Figure 2:
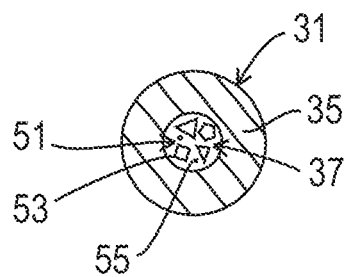

FIG. 1 shows a schematic sectional view of a hoop lock.
FIG. 2 shows a cross-section through a leg of the U-hoop of the hoop lock according to FIG. 1 along plane II-II.

DETAILED DESCRIPTION OF THE INVENTION

The hoop lock shown in FIG. 1 comprises an elongated lock body 11 and a hoop, which in the embodiment shown is formed as a U-hoop 31. The lock body 11 comprises two introduction openings 13 at its outer side, which open into two introduction passages 15 in the inner side of the lock body 11. Within the lock body 11 is a locking device 17, which in the embodiment example shown here comprises a locking cylinder 19 and two latches 21, which may be moved by means of the locking cylinder 19 selectively into a locking position shown in FIG. 1.

The U-hoop 31 comprises two hoop ends 33 which, in a closed position of the U-hoop 31 shown in FIG. 1, protrude through the introduction openings 13 of the lock body 11 through to the introduction passages 15 of the lock body 11. The U-hoop 31 comprises a substantially U-shaped tube 35 of hardened steel. In the exemplified embodiment shown here, the tube 35 has a circular cross-section and is formed cylindrical and hollow. Accordingly, the tube 35 comprises a continuous cavity 37 extending along the entire longitudinal extent of the tube 35. The tube 35 comprises a substantially constant outer diameter and a substantially constant wall thickness along its entire longitudinal extent. The wall thickness of the tube 35 is approximately one quarter of the outer diameter of the tube 35, as can also be seen in FIG. 2.

In the cavity 37 of the tube 35 there is a reinforcing filling 51 which comprises a granulate 53 embedded in a binding material 55. The granulate 53 comprises a plurality of non-uniformly shaped particles, in particular particles having a higher degree of hardness than that of the tube 35, for example are of hard metal or ceramic. The binding material 55 comprises a solder, for example a metallic solder.

The U-hoop 31 comprises at each of its two hoop ends 33 a respective locking structure in the form of a locking recess 39 formed at an outer side of the tube 35. In the embodiment example shown, the reinforcing filling 51 extends approximately to the height of the locking recesses 39. The locking recesses 39 are formed as closed recesses, i.e. they do not form a through-hole opening to the cavity 37 of the tube 35.

In an unlocked position of the latches 21 (not shown), the U-hoop 31 can be removed from the lock body 11 (open position). If, on the other hand, the U-hoop 31 takes up the closed position and the latches 21 of the locking device 17 are in the respective locking position as shown in FIG. 1, the U-hoop 31 is locked to the lock body 11. For this purpose, the latches 21 engage in the respective locking recess 39 of the U-hoop 31 or of the tube 35 and thus lock the U-hoop 31 against removal from the lock body 11.

The hoop lock shown is characterized by being highly secure against being broke open. Due to the tube 35 of the U-hoop 31 being made of metal, the U-hoop 31 has a high tensile strength. In the U-hoop 31 shown, this tensile strength is not significantly weakened by the locking recesses 39 of the tube 35, since the locking recesses 39 do not form through-hole openings, but rather, are formed entirely within the wall of the tube 35. At the same time, the reinforcing filling 51 in the cavity 37 of the tube 35 ensures a high degree of protection against sawing and grinding due to the granulate 53 contained therein.

With regard to the embodiment example shown, it should be noted that the locking recesses 39 may also be formed as annular grooves. Instead of locking recesses 39, locking protrusions (e.g. webs) or combinations of locking recesses 39 and locking protrusions may also be provided, which for example can be formed by punching. In the case of applying a locking protrusion by punching, the tube 35 (e.g., wall thickness) and the punching process (e.g., tool, plunging depth, direction, force) are matched in such a way that the locking protrusion within its surroundings does not form any opening to the cavity 37 of the tube 35.

Instead of a U-hoop 31, a differently curved hoop or a straight hoop may also be provided, and/or the hoop may be configured in several parts, as is generally known from the documents mentioned in the introduction. In such embodiments, the geometry of the hoop end 33, the locking structure or locking recess 39 and the latch 21 interacting therewith, may be formed similar to area A according to FIG. 1.

What is claimed is:

1. A hoop lock having a lock body and a hoop,
   wherein the lock body comprises at least one introduction opening which opens into an introduction passage, wherein the lock body further comprises a locking device,
   wherein the hoop may be selectively brought into an open position or a closed position with respect to the lock body, wherein the hoop comprises at least one hoop end which, in the closed position of the hoop, protrudes through the introduction opening into the introduction passage of the lock body, wherein, in the closed position, the hoop is lockable at the lock body by the locking device,
   wherein the hoop comprises a tube formed of metal and having a cavity extending in a longitudinal direction of the tube in which a reinforcing filling is disposed, wherein the reinforcing filling comprises a granulate embedded in a binding material,
   wherein, in the closed position of the hoop, the reinforcing filling extends at least up to the height of the introduction opening of the lock body,
   wherein the at least one hoop end comprises at least one locking structure for a locking engagement with the locking device, wherein the locking structure is in the form of a recess that extends into an outer side of a wall section of the tube without forming an opening into the cavity of the tube and does not protrude into the cavity;
   wherein the wall section circumferentially encloses the cavity.

2. The hoop lock according to claim 1, wherein the reinforcing filling extends from a central section of the hoop at least to the height of the at least one locking structure.

3. The hoop lock according to claim 1, wherein the at least one hoop end at the height of the locking structure has no additional reinforcing element in the cavity of the tube.

4. The hoop lock according to claim 1, wherein the tube of the hoop is formed of hardened steel or self-hardening steel.

5. The hoop lock according to claim 1, wherein the tube of the hoop has a circular, oval, or polygonal cross-section.

6. The hoop lock according to claim 1, wherein the tube of the hoop has a wall thickness which is at least a quarter of the outer diameter of the tube.

7. The hoop lock according to claim 1, wherein the cavity of the tube extends to the at least one hoop end of the hoop.

8. The hoop lock according to claim 1, wherein the cavity of the tube extends over the entire length of the hoop.

9. The hoop lock according to claim 1, wherein the tube of the hoop has at least one of:
   a constant outer diameter or
   a constant wall thickness or
   a constant inner diameter,
   over the entire length of the hoop.

10. The hoop lock according to claim 1, wherein the granulate of the reinforcing filling comprises at least one of hard metal particles or ceramic particles, wherein the particles have an irregular shape.

11. The hoop lock according to claim 1, wherein the granulate of the reinforcing filling has a grain size in the range from 0.5 mm to 5 mm.

12. The hoop lock according to claim 1, wherein the inner diameter of the tube is larger than the granularity of the granulate by a factor in the range of 2 to 3.

13. The hoop lock according to claim 1, wherein the binding material comprises a solder.

14. The hoop lock according to claim 1, wherein a boundary surface of the cavity of the tube has a roughened or drawn surface at least in the region of the reinforcing filling.

15. The hoop lock according to claim 1, wherein the locking device comprises at least one movable latch, wherein the hoop, in the locked position, is lockable at the lock body in that the at least one latch is moved into a locking position in which the at least one latch is in a locking engagement with the at least one locking structure of the hoop.

16. The hoop lock according to claim 1, wherein the hoop is formed as a U-hoop, wherein the tube is substantially U-shaped.

17. The hoop lock according to claim 1, wherein the recess is formed at a radially outer circumference of the wall section of the tube, wherein said wall section at which the recess is disposed radially encloses the cavity of the tube at an inner circumference of said wall section.

18. The hoop lock according to claim 17, wherein the recess extends radially inward into said wall section of the tube, wherein the reinforcing filling is disposed radially inward from the recess and radially in line with the recess, wherein material of the tube is disposed radially between the reinforcing material and a radially inward end of the recess.

19. A method of manufacturing the hoop lock of claim 1, comprising the steps of:
   providing the tube, wherein the tube is formed of metal and has the having a cavity extending in the longitudinal direction of the tube;
   forming, at least at one end of the tube, the at least one locking structure at the outer side of the tube, without forming an opening to the cavity of the tube;
   filling the reinforcing filling into the cavity, wherein the filling comprises a mixture of the granulate and the binding material in loose form; and
   heating and subsequently cooling the binding material in order to initially liquefy and subsequently solidify the binding material, so that the granulate is fixedly embedded in the binding material;
   inserting the hoop into the lock body.

20. A method of manufacturing the hoop lock of claim 1, comprising the steps of:
   providing the tube formed of metal and having the cavity extending in the longitudinal direction of the tube;
   forming, at least at one end of the tube, the at least one locking structure at the outer side of the tube, without forming an opening to the cavity of the tube;
   filling the granulate, wherein the granulate is a reinforcing granulate, into the cavity in a solid but loose form;
   applying a stopper comprising the binding material to at least one end of the tube in order to close the cavity at that end;
   heating the tube and thus the stopper of binding material such that the binding material melts and flows into the reinforcing granulate; and
   subsequent cooling of the tube and thus of the binding material in order to solidify the binding material, so that the reinforcing granulate is fixedly embedded in the binding material;
   inserting the hoop in the lock body.

21. A hoop lock having a lock body and a hoop,
   wherein the lock body comprises at least one introduction opening which opens into an introduction passage, wherein the lock body further comprises a locking device,
   wherein the hoop may be selectively brought into an open position or a closed position with respect to the lock body, wherein the hoop comprises at least one hoop end which, in the closed position of the hoop, protrudes through the introduction opening into the introduction passage of the lock body, wherein, in the closed position, the hoop is lockable at the lock body by the locking device,
   wherein the hoop comprises a tube formed of metal and having a cavity extending in a longitudinal direction of the tube in which a reinforcing filling is disposed, wherein the reinforcing filling comprises a granulate embedded in a binding material,
   wherein, in the closed position of the hoop, the reinforcing filling extends at least up to the height of the introduction opening of the lock body,
   wherein the at least one hoop end comprises at least one locking structure for a locking engagement with the locking device, wherein the locking structure is in the form of a recess that extends into an outer side of a wall section of the tube without forming an opening into the cavity of the tube and does not protrude into the cavity;
   wherein the wall section circumferentially encloses the cavity;
   wherein the locking device comprises at least one moveable latch, wherein the hoop, in the locked position, is lockable at the lock body in that the at least one latch is moved into a locking position in which the at least one latch is in a locking engagement with the at least one locking structure of the hoop;
   wherein the locking device comprises a key-operated lock cylinder, an electric motor, or an electromagnet that drives the at least one latch;
   wherein the at least one locking structure in the form of the recess extends along only a portion of the circumference of the tube.

* * * * *